US006823402B2

(12) United States Patent
Smith et al.

(10) Patent No.: US 6,823,402 B2
(45) Date of Patent: Nov. 23, 2004

(54) APPARATUS AND METHOD FOR DISTRIBUTION OF SIGNALS FROM A HIGH LEVEL DATA LINK CONTROLLER TO MULTIPLE DIGITAL SIGNAL PROCESSOR CORES

(75) Inventors: Patrick J. Smith, Houston, TX (US); Jay B. Reimer, Houston, TX (US); Ramesh A. Iyer, San Jose, CA (US); Henry D. Nguyen, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 390 days.

(21) Appl. No.: 10/001,152

(22) Filed: Nov. 14, 2001

(65) Prior Publication Data

US 2003/0093595 A1 May 15, 2003

(51) Int. Cl.[7] .............................................. G06F 13/28
(52) U.S. Cl. ............................. 710/22; 710/23; 710/26; 710/48; 710/49; 710/52; 710/308; 710/309
(58) Field of Search ......................... 710/22–28, 48–52, 710/308–309

(56) References Cited

U.S. PATENT DOCUMENTS

| | | | | |
|---|---|---|---|---|
| 5,828,856 A | * | 10/1998 | Bowes et al. | ................. 710/308 |
| 6,275,877 B1 | * | 8/2001 | Duda | ........................... 710/23 |
| 6,434,649 B1 | * | 8/2002 | Baker et al. | ................. 710/107 |
| 6,487,643 B1 | * | 11/2002 | Khare et al. | ................. 711/150 |

* cited by examiner

Primary Examiner—Jeffrey Gaffin
Assistant Examiner—Mike Nguyen
(74) Attorney, Agent, or Firm—William W. Holloway; W. James Brady; Frederick J. Telecky, Jr.

(57) ABSTRACT

In a data processing system including a plurality of digital signal processor subsystems, selected peripheral components are shared by the digital signal processor subsystems. In particular, the high level data link controller is shared by the subsystems. When a packet is received by a shared high level data link controller, the data signal groups are processed and placed in a temporary storage unit. The address signal group of the received packet is applied to channel block unit where the digital signal processor subsystem, to which the packet is directed, is identified and an INTERRUPT signal corresponding to the identified digital signal processor subsystem is generated. The INTERRUPT signal is applied to a switch. The switch, which receives the signal groups from the temporary storage unit, directs the signal groups to a buffer memory in the channel associated with the identified signal processing subsystem. In response to a predetermined condition, the signal groups are forwarded to the identified digital signal processor subsystem. The channel block unit, in response to preselected signal groups, can direct the packet to a digital signal processor subsystem that is different from the digital signal processor subsystem identified by the address signal group.

14 Claims, 6 Drawing Sheets

APPARATUS AND METHOD FOR DISTRIBUTION OF SIGNALS FROM A HIGH LEVEL DATA LINK CONTROLLER TO MULTIPLE DIGITAL SIGNAL PROCESSOR CORES

RELATED APPLICATIONS

U.S. patent application Ser. No. 10/001,153, entitled APPARATUS AND METHOD FOR RESPONDING TO A INTERRUPTION OF A PACKET FLOW TO A HIGH LEVEL DATA LINK CONTROLLER IN A SIGNAL PROCESSING SYSTEM, invented by Ramesh A. Iyer, Henry D. Nguyen, Patrick J. Smith, and Jay B. Reimer, filed on even date herewith and assigned to the assignee of the present Application; and U.S. patent application Ser. No. 10/000,990, entitled APPARATUS AND METHOD FOR CONTROLLING BLOCK SIGNAL FLOW IN A MULTI DIGITAL SIGNAL PROCESSOR CONFIGURATION FROM A SHARED PERIPHERAL DIRECT MEMORY CONTROLLER TO HIGH LEVEL DATA LINK CONTROLLER, invented by Patrick J. Smith, Jay B. Reimer, Ramesh A. Iyer and Henry D. Nguyen, filed on even date herewith and assigned to the assignee of the present Application are related Applications.

BACKGROUND OF THE INVENTION

1. Field of the Invention

This invention relates generally to data processing systems and, more particularly, to data processing systems having multiple digital signal processor subsystems exchanging data by means of a high level data link controller. The high level data link controller processes a plurality of signal groups from a digital signal processor subsystem and transmits the signal groups as a signal packet. The high level data link controller receives a signal packet and applies reformatted signal groups to the digital signal processor subsystem. The present invention relates to the flow of signal groups from a high level data link controller to a peripheral direct memory access unit.

2. Background of the Invention

As the applications to which the digital signal processor has been applied have increased in magnitude and complexity, the need greater computational power has increased. One response to the requirement of additional computational power has been to provide a plurality of digital signal processor subsystems on a chip. The requirement for additional computational power has also resulted in an increased need for the exchange of signal groups among the plurality of processors and with external components. Several ports have been developed to provide for this signal group exchange. For example, a serial port can be provided that can participate in the exchange of signal groups with other digital signal processors and a host processor. Similarly, a port can be provided that can provide signal group exchange with peripheral units. And a high level data link controller port can be been provided that permits the exchange of packets of signals used in communication applications.

Referring to FIG. 1, a digital signal processor system 1 having a plurality of digital signal processor subsystems 10(1) through 10(N), according to the prior art, is shown. Each digital signal processor subsystem 10(1) includes a central processing unit (digital signal processor core) 101 and a memory unit 103. The central processing unit 101 processes signal groups stored in the memory unit 103 and exchanges signals therewith. The direct memory access unit 105 is coupled to the memory unit 103 and permits the exchange of signals between the memory unit 103 and external components without impact upon the performance of the central processing unit 101. The central processing unit 101 is also coupled to a host port interface unit 115. The host port interface unit 115 enables the central processing unit 101 to communicate with the host processing unit (not shown). Coupled to the direct memory access unit 105 typically are a multi-channel buffered serial port 107, a peripheral component interface unit 109 and high level data link controller unit 111. The multi-channel buffered serial unit 107 exchanges signal groups in a serial format with the host computer unit and off-chip devices. The peripheral component interconnect unit 109 permits the exchange of signals with off-chip peripheral devices. The high level data link controller 111 permits the exchange of packets of signal groups, typically used in communication protocols, with off chip components.

As will be clear from FIG. 1, the subsystems 10(1) through 10(N) operate independently. Thus, a complete set of interface units to exchange signal groups with off chip components must be supplied for each subsystem 10(1) through 10(N) to insure that the operation of each subsystem 10(1) through 10(N) will not be limited. However, the result of provision of a complete set of interface units with each subsystem is an inefficient use of the semiconductor material and components that are not efficiently used. The signal packets applied to the high level data link controller must be directed rapidly and efficiently to the correct central processing unit.

A need has been felt for apparatus and an associated method having the feature of reducing component redundancy resulting from the duplication of components in a multiprocessor component. The apparatus and associated method would have the more particular feature of reducing the number of interface components on the chip. It would be yet another feature of the apparatus and associated method that the subsystems on the chip would share interface components. It would be a still further feature of the apparatus and associated method that a single high level data link controller can receive and process signal packets and forward the processed packet to a central processing unit designated by the packet address. It would be yet a further feature of the apparatus and associated method to forward processed signals from the packet to a buffer memory in the channel of the addressed central processing unit. It would be still further feature of the apparatus and associated method to be able to direct a received packet to central processing unit different from the central processing unit indicated by the address included in the received signal packet.

SUMMARY OF THE INVENTION

The aforementioned and other features are accomplished, according to the present invention, by providing a data processing subsystem having a plurality of digital signal processing components, a shared memory subsystem, and a global direct memory access subsystem on a chip. Each digital signal processing subsystem includes a central processing unit and a memory unit. The global direct memory access subsystem includes a peripheral direct memory access unit and high level data link controller. The peripheral direct memory access unit includes a channel associated with each digital signal processing components. Each channel includes a buffer memory for temporary storage of the processed received signal packet prior to forwarding the processed signal packet to the digital signal processing component associated with the channel. The high level data link controller includes a first in-first out memory unit for storage of processed signal groups prior to transfer to the buffer memory unit in the peripheral direct access unit. The high level data link memory unit includes a channel block unit that receives the address signal group of the received packet and, based on the address signal group, generates and INTERRUPT signal that identifies channel/digital signal processing component to which the received packet is directed. This INTERRUPT signal is applied to a switch unit in the peripheral direct memory access unit. In response to the INTERRUPT signal, the switch directs the processed signal groups in the first in-first out storage unit to the channel buffer storage unit associated with the digital signal processing component to which the received signal packet is directed. The channel block unit can, in response to predetermined signal groups, change the digital signal processing component to a different component from the component specified in the address portion of the received packet.

BRIEF DESCRIPTION OF THE DRAWINGS

FIG. 3A illustrates the format of the blocks of data processed by the high level data link controller for external transmission according to the present invention, while

DESCRIPTION OF THE PREFERRED EMBODIMENTS

1. Detailed Description of the Figures

Figure 1:
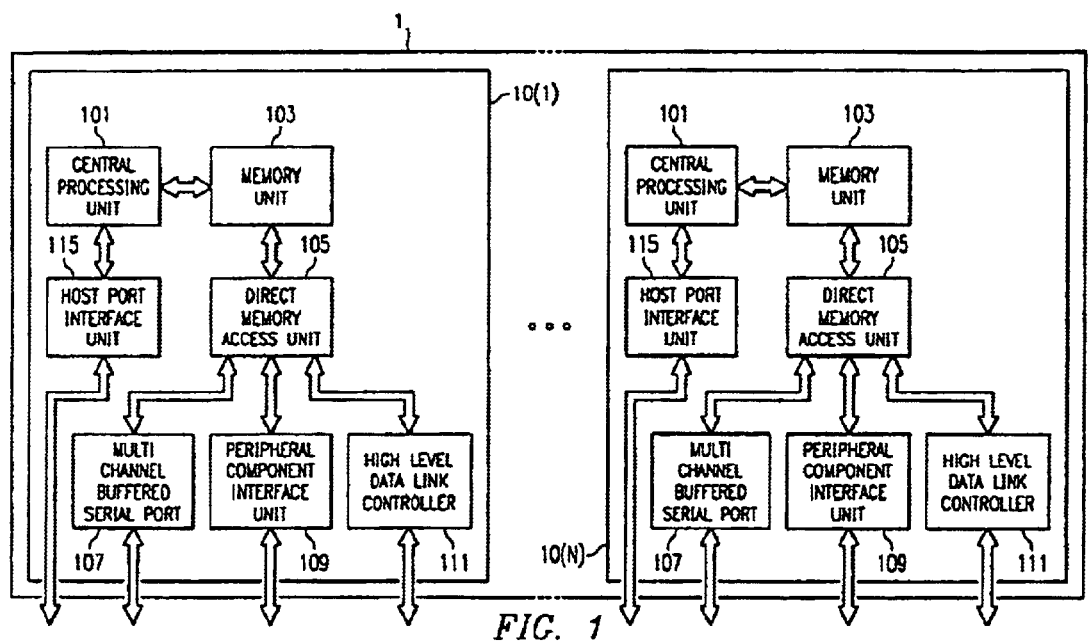
FIG. 1 is a block diagram of a digital signal processor system having a plurality of digital signal processors according to the prior art.

FIG. 1 has been described with respect to the related art.

Figure 2A:
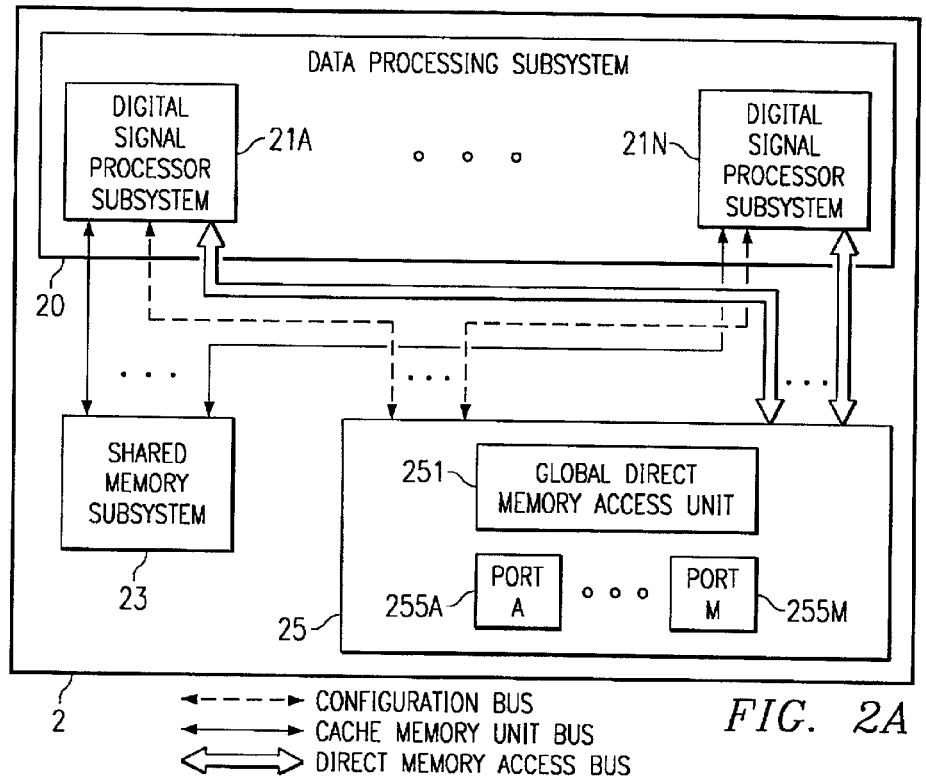
FIG. 2A is a block diagram of a block diagram of the subsystems of a data processing system having a plurality of central processing units capable of advantageously using the present invention.

Referring to FIG. 2A, a block diagram illustrating the subsystems of a data processing system 2 capable of advantageously using the present invention is shown. The data processing system 2 includes a data processing subsystem 20, a shared memory subsystem 23 and a communication subsystem 25. The data processing subsystem 20 includes a plurality of digital signal processing subsystems 21A through 21N. The communication subsystem includes a global direct memory access unit 251 and a plurality of signal exchange ports 25A through 25M. Each digital signal processor subsystem 21A through 21N is coupled to the shared memory subsystem 24 by a cache memory unit bus represented by a solid line. Each digital signal processor subsystem 21A through 21N is coupled to the communication subsystem 25 by a configuration bus represented by a dotted line and each digital signal processor subsystem 21A through 21N is coupled to the communication subsystem 25 by a direct memory access bus represented by a double solid line.

Figure 2B:
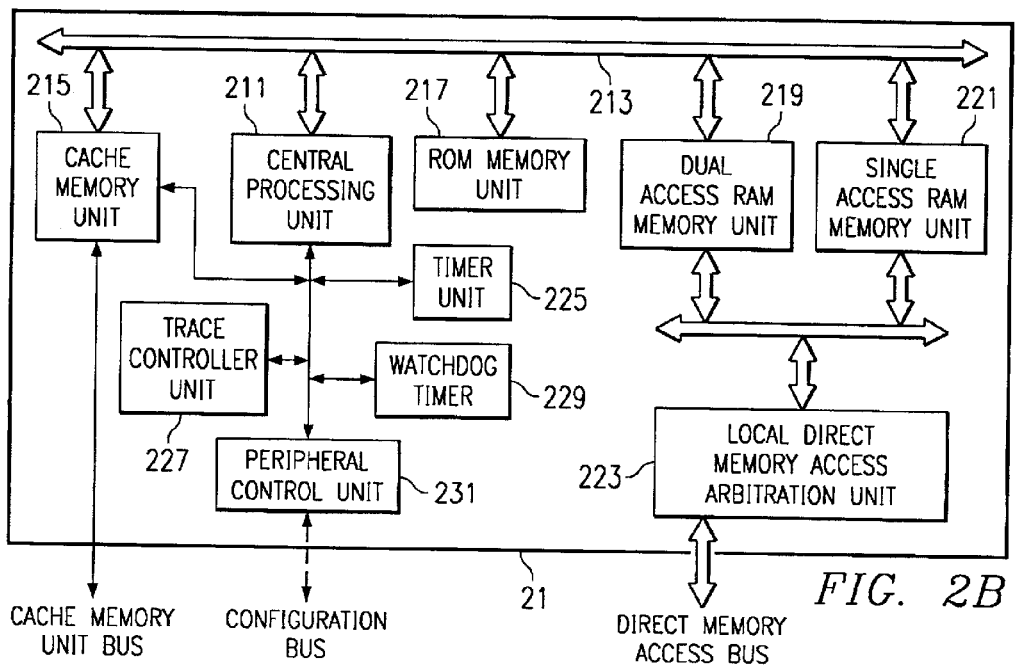
FIG. 2B illustrates the components of the digital signal processor subsystem in FIG. 2A.

Referring to FIG. 2B, the principal components of the digital signal processor subsystems 21A through 21N are shown. The digital signal processor subsystem includes a central processing unit 211 coupled to a central processing unit bus 213. The central processing unit bus 213 is coupled to cache memory unit 215, to ROM memory unit 217, to dual access RAM memory unit 219, and to single access RAM memory unit 221. The dual access RAM memory unit 219 and the signal access RAM memory unit 221 are coupled to local direct memory access arbitration unit 223. The local direct memory access arbitration unit 223 is an interface to a plurality of components of the direct memory access bus, i.e., to the communication subsystem. The Cache memory unit 215 is coupled to the cache memory unit bus and therefore to the shared memory subsystem 24. The central processing unit is coupled to the timer unit 225, the watchdog timer unit 229, to the trace controller unit and to the peripheral control unit 231 The central processing unit 211 is coupled to timer unit 224, to the watchdog timer unit 229 to the trace controller unit 227, and to the peripheral control unit 231. The peripheral control unit 231 is coupled through the configuration bus to the communication subsystem. 24.

Figure 2C:
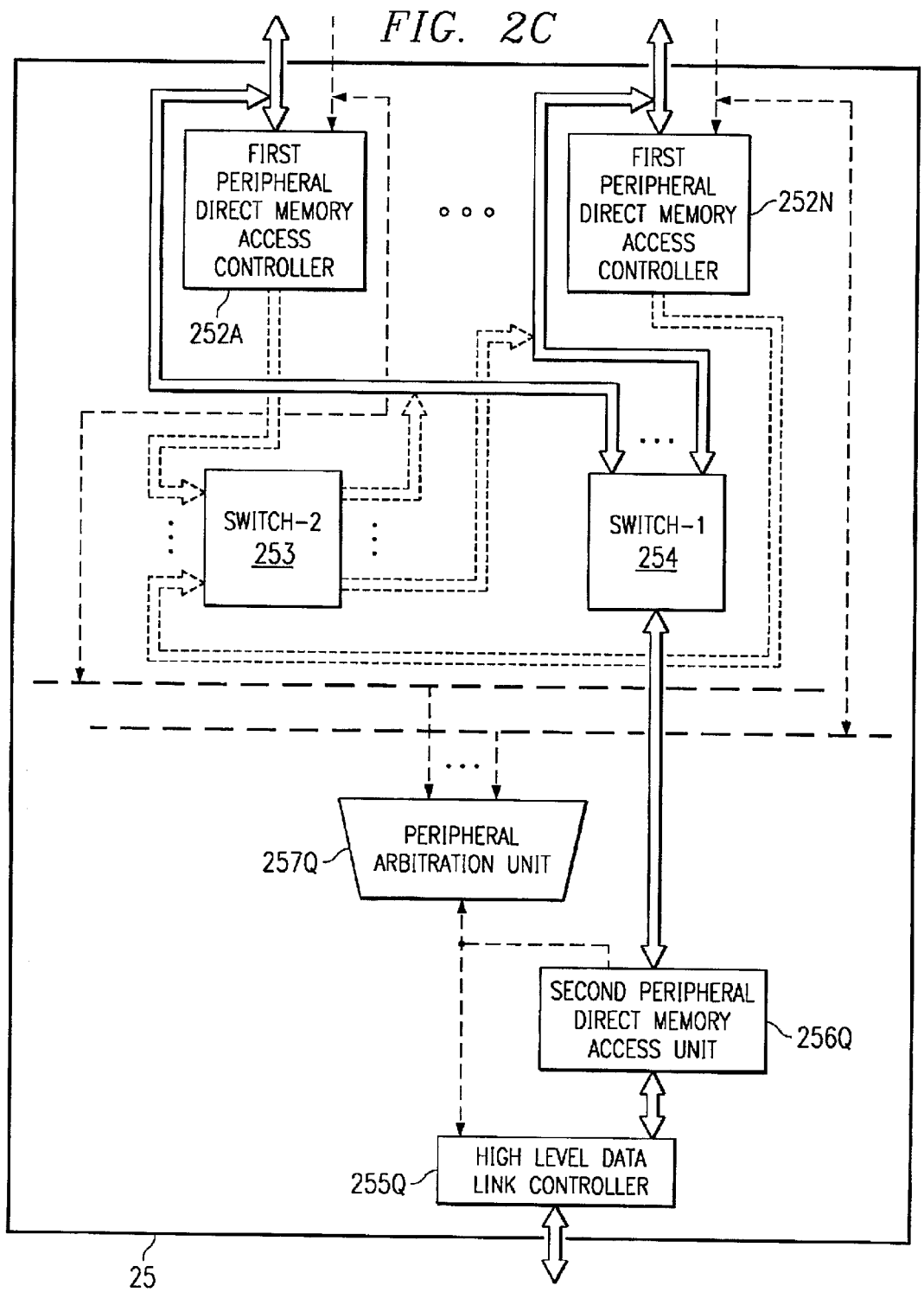
FIG. 2C illustrates the components of the communication subsystem of FIG. 2A.

Referring to FIG. 2C, the principal components of the communication subsystem 25, as it relates to the present invention, are illustrated. Each digital signal processor subsystem 21A through 21N has associated therewith a first peripheral direct memory access unit 252A through 252N, respectively. Each first direct memory access unit 252A through 252N has the direct memory unit access bus and the configuration bus from the associated digital signal processor subsystem 21A through 21N, respectively, coupled thereto. The direct memory access bus coupled to each digital signal processor 21A through 21N is also coupled the input terminals of switch-1 254. Data groups from the local direct memory access units 223A through 223N can be applied to the associated first peripheral direct memory access unit 252A through 252N and to the switch-1 254. The first peripheral direct access memory unit 242A through 252N are related to the transfer of signal groups between the dual access RAM memory unit 219 and the single access RAM memory unit 221 of a first digital signal processing unit and the dual access RAM memory unit 219 and single access RAM memory unit 221 of a second digital signal processing unit or an external device. The switch-1 254 is coupled to a second peripheral direct memory access unit 256Q. The second direct memory access unit 256Q is coupled to the high level data link controller 255Q. The high level data link controller 255Q is one of a plurality interface units that exchanges signal groups/packets with the external components. In the present invention, the focus is on the transfer of signal groups from the digital signal processor unit 21A through 21N to the high level data link controller 255Q. Control signals are provided from the digital signal processors 21A through 21N to the global direct memory access unit 25 by the configuration bus (cf. FIG. 2A). In FIG. 2C, the configuration bus from each digital signal processor subsystem is coupled to peripheral arbitration unit 257Q. The peripheral arbitration unit 257Q applies control signals to the second peripheral direct memory access unit 256Q and to the high level data link controller 255Q. A peripheral arbitration unit and a second peripheral direct memory access controller are associated with each of the interface units or ports.

Figure 3A:
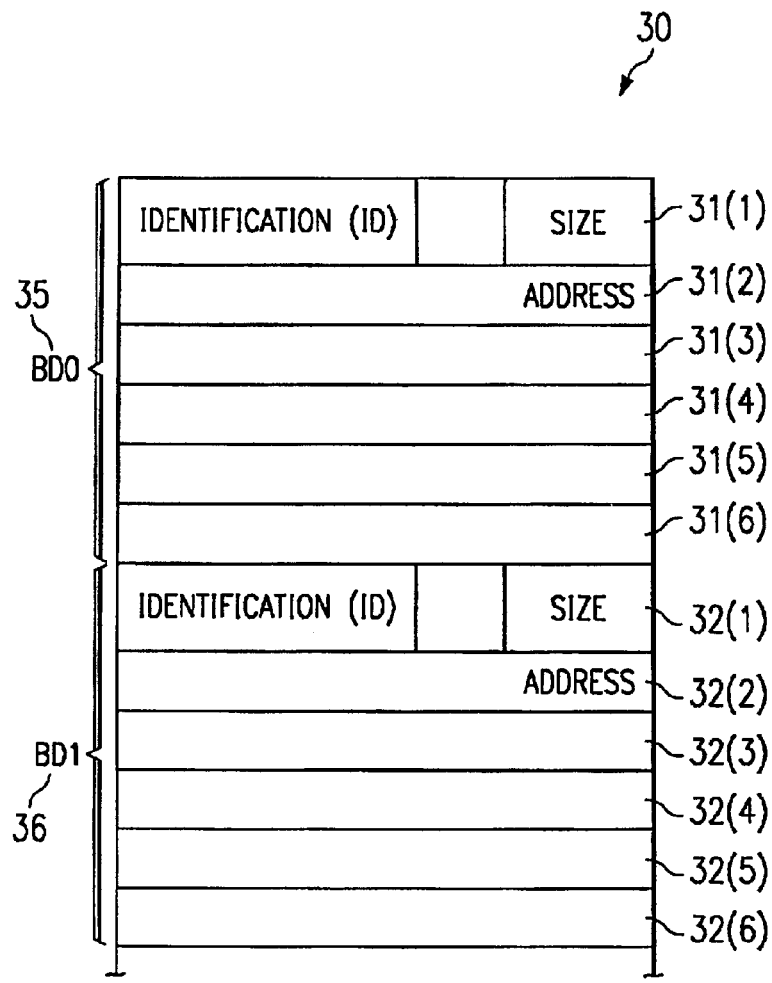

Referring to FIG. 3A, the format of the data files applied to the high level data link controller and used by the high level data link controller to form signal packets is shown. The files are formed, in the preferred embodiment, by blocks of data. In FIG. 3, two data blocks BD0 35 and BD1 36, are shown. The data block BD0 35 is comprised of a multiplicity of groups of data signals, BD0 35 comprising signal groups 31(1) through 31(6), each signal group 4 bytes in length. The data block BD1 36 is comprised of signal groups 32(1) through 32(N), each signal groups 4 bytes in length. The first data group in each block of data is the header and includes identification (ID) information and the size of the data block, i.e., the number of groups of bytes. In the second signal group is found the address to which the data block is directed.

Figure 3B:
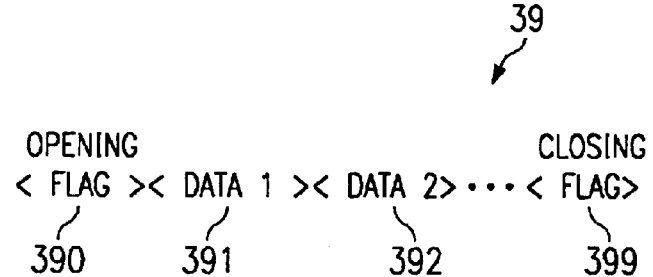
FIG. 3B illustrates the format of the signal packets received by the high level data link controller from external sources.

Referring to FIG. 3B, the format of the signal packets sent to and received from external sources is shown. The signal packet includes a first signal group390 that operates as an opening flag to alert the high level data link controller of the beginning of a signal packet. Following the opening signal group, a second signal or first data group 391 includes the address which identifies where the signal group packet is to be stored. The third signal group or second data group 392 and subsequent signal groups include the data being transmitted. The final signal group 399 is a flag signal group indicating the end of packet 39.

Figure 4:
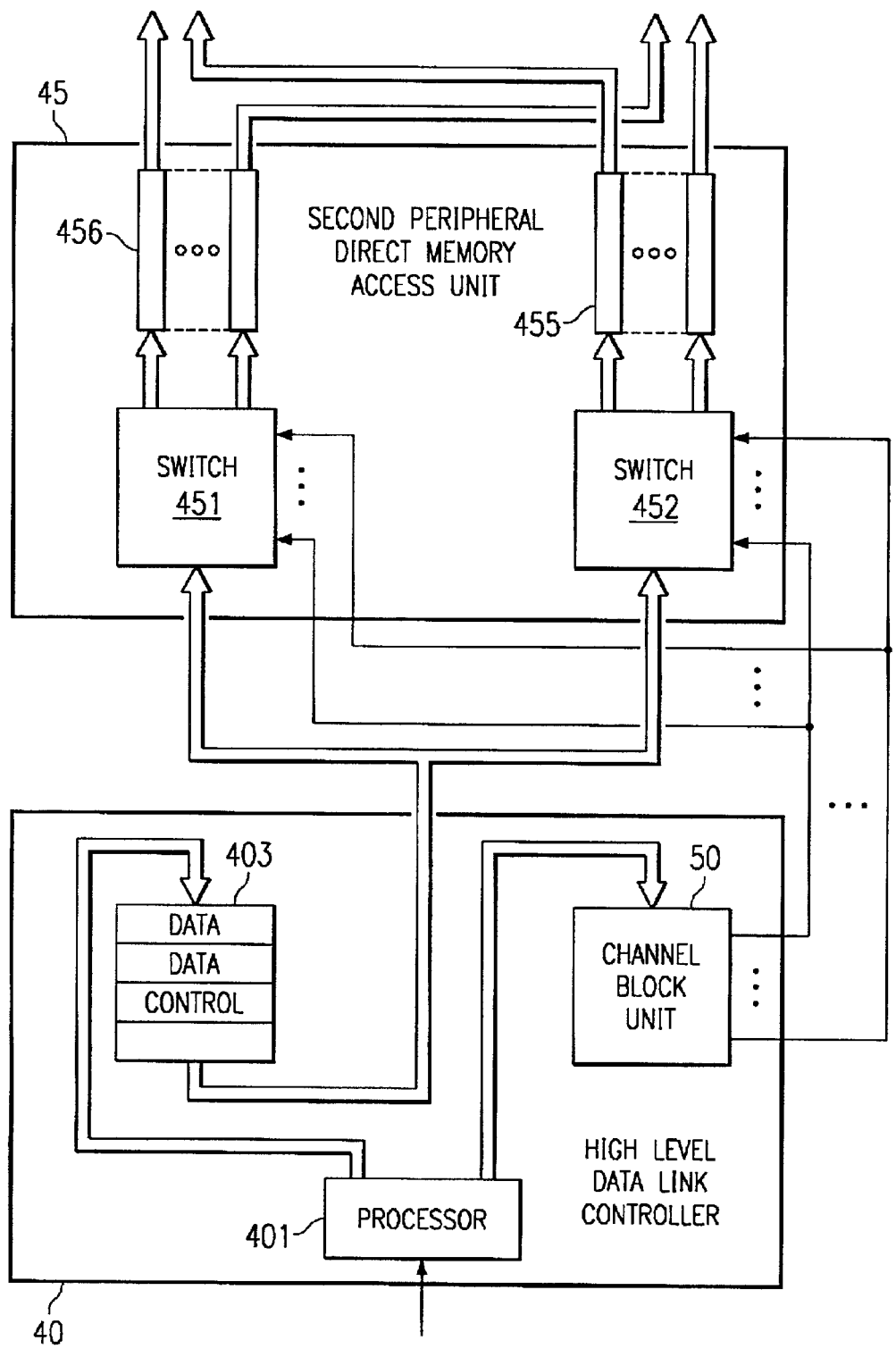
FIG. 4 is a block diagram of the apparatus of the high level data link controller for processing externally applied signal packets according to the present invention.

Referring to FIG. 4, the components necessary for understanding the transfer by the high level data link controller 40 to the second peripheral direct memory access unit 45 of the received packet signal groups according to the invention is shown. An externally-generated signal packet, with the format illustrated in FIG. 3B, is applied to the processor 401 in the high level data link controller 40. The processor 401 transfers the first data signal group, i.e., the address signal group of the packet 391 to the channel block unit 405. The channel block unit 405 determines to which central processing unit the packet is directed and generates a channel interrupt signal indicative of the destination central processing unit. Each of the multiple digital signal processor subsystems fabricated on the chip has a channel associated therewith. The memory units associated with each of the multiple central processing units are not independent, but are considered to be part of the total memory. Each of the memory units associated with a multiple central processing unit has addresses that do not overlap with the memories associate with the other central processing units. The address in the first data signal group 391 of the packet therefore identifies a memory unit associated with one of the central processing units. The identification of the central processing unit also an identification of an associated channel. The interrupt signal generated by the channel block unit 50 identifying a channel/central processing unit is applied to switch 451 and switch 452 in the second peripheral direct memory access unit 45. The processor 401 stripes the flags from the packet and reformats the serially formatted signals of the received packet into (double) byte signal groups. The reformatted signal groups are temporarily stored in the first in-first out storage unit 403. In addition, the processor 401 generates a control (double byte) signal group that is also stored in the first in-first out storage unit 403 after the data signal groups have been reformatted and entered in the first in-first out storage unit 403. The data signal groups in the first in-first out storage unit 403 are applied to input terminals of switch 452 and the control signal group in the first in-first out register 403 is applied to input terminals of switch 451. The switch 452 has a plurality of groups of output terminals, each group of output terminals associated with a channel, i.e., digital signal processor subsystem. Each group of output terminals is coupled to a buffer unit of a buffer unit bank 455. Each buffer storage unit of buffer storage unit bank 455 is associated with a preselected channel (digital signal processor subsystem). Thus, the INTERRUPT signals applied to switch 452 determine into which buffer unit of buffer unit bank 455 the data signal groups from the first in-first out register are to be stored and therefore to which digital signal processor subsystem memory the data signal groups will be transferred. Similarly, the control signal group stored in the first in-first out storage unit 403 is applied to input terminals of switch 451. Each output terminal group of the switch 451 are applied to a register of register bank 456. The switch 451, based on the INTERRUPT signals from the channel block unit 405, determines to which register of register bank 456 the control signal group from the first in-first out register is applied. The particular register of register bank 456 determines to which digital signal processor subsystem the control signal groups will be forwarded and is therefore associated with a channel.

Figure 5:
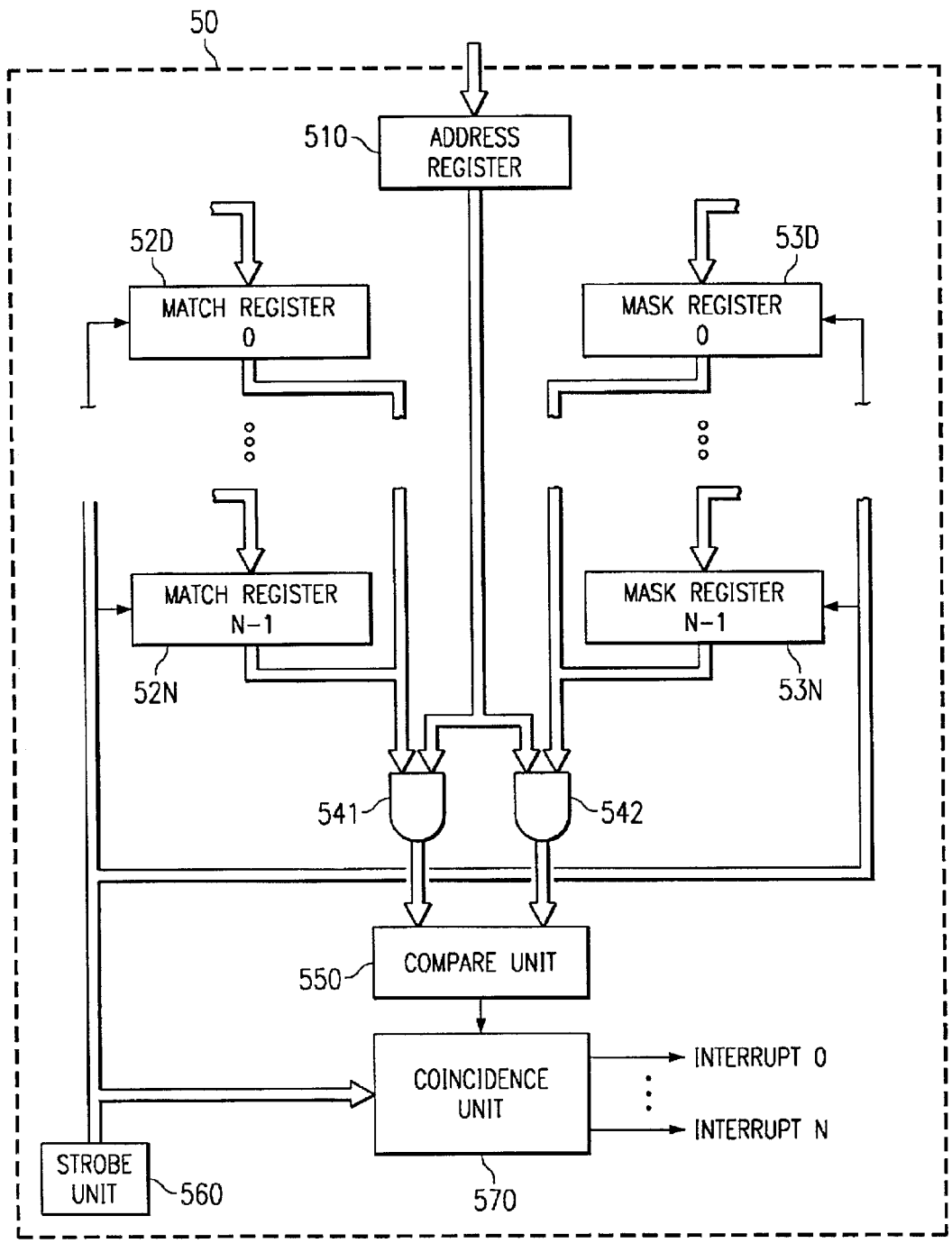
FIG. 5 is a block diagram of the channel block unit within the high level data link controller for generating interrupt signals according to the present invention.

Referring to FIG. 5, a block diagram of the channel block unit 50 of the high level data link controller 40 generating the INTERRUPT signals is shown according to the present invention is shown. Address register 510 receives the address signal group that has been applied to the high level data link controller as the first data group in the packet. This address signal group is applied to a first set of terminals of logic AND gate 541 and first set of terminal of logic AND gate 542. A series of match registers 520 through 52N each includes logic bits that are indicative of the channel address for one of the digital signal processor subsystem. Mask registers 530 to 53N identify the bit positions of the address that would define the channel. The stored signals in the match registers 520 to 52N, in response to signals from strobe unit 560, apply signals to a second set of input terminals of logic AND gate 541. Each significant bit position of the address register has a logic AND operation performed with the corresponding bit position of the contents of the match register being applied to logic AND gate 541. Similarly, the contents of the address register 510 are applied to a first set of input terminals of logic AND gate 542. The contents of the mask registers 530 to 530N, in response to signals from strobe unit 560, are applied to a second set of terminals of logic AND gate 542. Each bit position of address register 510 have an AND operation performed with the corresponding bit position of mask register currently being applied to the second set of input terminals of the logic AND gate 542. The output signals of the logic AND gate 541 and 542 are applied to compare unit 550. The results of the compare unit 550 are applied to coincidence unit 570. The coincidence unit 570 also receives signal from the strobe unit 560. Based on the signals from the compare unit 550 and the strobe unit 560, one of the INTERRUPT 0 through N signals is generated and applied to the second peripheral direct access unit 45.

2. Operation of the Preferred Embodiment

Referring once again to FIG. 1 and FIG. 2, rather than provide each subsystem with multi-channel buffered serial port unit, a peripheral component interconnect unit and a high level data link controller, these and selected components are fabricated on the chip, but not as part of the digital signal processor subsystems. In this manner, using the switch 1, these components are shared. Signal groups are transferred from the memory unit of each digital signal processor subsystem to a channel memory unit of the peripheral direct memory access unit. Each channel memory is associated with at least one of the subsystems. The channel memories can be formed by partitioning a standard memory unit. Each channel memory is accessed on a first in first out scheme. Signal groups are transferred from the channel memory unit to the FIFO memory unit of the high level data link controller each time an INTERRUPT 1 signal generated in the high level data link controller is received by the peripheral direct memory access unit. The INTERRUPT 1 signal is generated when a signal group has been written into the high level data link controller FIFO memory unit and a location in the FIFO memory unit is available for storage of another signal group. The INTERRUP 1 signal causes the storage in the FIFO memory unit of the next sequential signal group of a block of data following the storage of a signal group of the block of data causing the INTERRUPT 1 signal. When the last signal group of a block of data has been transferred to the FIFO memory unit, an INTERUPT 2 signal is generated. The INTERRUPT 2 results in the first signal group from a block of data stored in a preselected next channel memory to be transferred to the FIFO memory unit. In this manner, one processor subsystem can not monopolize the transfer of signals groups through the high level data link controller.

In the preferred embodiment, the processor of the high level data link controller can process a signal group every clock cycle. Similarly, the first interrupt signal can be generated every clock cycle. In addition, the transfer of signal groups from the peripheral direct memory access unit to the high level data link controller can occur every clock cycle. Consequently, the transfer of the signal groups according to the present invention can be very efficient.

In FIG. 5, the apparatus processing and transferring the signal groups from the packets applied to the high level data link controller to a channel memory for later transmission to the memory unit of the multiple central processing units associated with the channel memory is shown. The strobe unit 560 enables the match registers 520 through 52N in sequence. Each activation of a match register 52Q results in the contents of the enabled match register 52Q being applied to the second set of input terminals of logic AND gate 541. With each enabling of the match register 52Q, the strobe signal enables the corresponding mask register 53Q. The enabling of the mask register 53Q results in the signals stored in the mask register 53Q to be applied to the second set of input terminals of logic AND gate 542. The address signal group is applied to the first set of input terminals for both the logic AND gate 541 and the logic AND gate 542. The output signals of the logic AND gate 541 and logic AND gate 542 are applied to the compare unit 550. When the results of this comparison are positive, then the address in the address register 510 is determined to be in the memory unit of the central processing unit associated with the corresponding match register/mask register combination. The strobe signal applied to the coincidence unit, when the compare unit 550 identifies a positive comparison, activates the interrupt signal associated with the channel (and central processing unit) associated with the positive comparison. The interrupt signal sets the switch 451 and the switch 542 so that the data signal groups and the control signal groups are transferred to the appropriate channel storage buffers of storage buffer set 456 and storage buffer set 455. When a predetermined condition occurs, for example, a predetermined number of signal groups are stored in the selected storage buffer in storage buffer set 455, the stored signal groups are transferred to the corresponding memory unit. The strobe unit 560 activates the match/mask register combinations sequentially until a match with the address register signal group is found. The signals from the strobe unit 560 coordinate the enabling of the match register/mask register pair with the generation of the associated INTERRUPT signal.

The embodiment illustrated in FIG. 5 has a further flexibility. Signal groups can be entered in the match register and the mask register combination "on the fly". Thus, the destination central processing unit can be controlled. Thus, when one digital signal processor subsystem is no longer available for receiving signal groups, the signal groups can be directed to a different central processing unit by changing the signals stored in the appropriate match register/mask register pair. The INTERRUPT signals are each associated with a match register/mask register pair.

The control signal group is generated after the signal packet has been processed. In the preferred embodiment, the control signal group includes a field having the length of the buffer holding the received data signal groups, a direct management transfer complete field, and a receive frame status field.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A data processing system comprising:
   a plurality of digital signal processor subsystems, each including a first peripheral direct memory access unit;
   a high level data link controller coupled to the first peripheral direct memory access unit, the high level data link controller including;
      a processor for processing received signal packets;
      a memory unit for storing processed data signal groups; and
      channel block unit, the channel block unit selecting one of a plurality of control signals, the selected control signal determined by the address signal group of a received packet signal group, each control signal corresponding to a one the plurality of digital signal processor subsystems; and
   a second peripheral direct memory access unit including;
      a plurality of buffer storage units, each buffer storage unit coupled to a one of the peripheral first direct memory access units; and
      a switch unit responsive to a selected control signal from the channel block unit for coupling the memory unit to a buffer storage unit, the buffer storage unit and the selected control signal corresponding to digital signal processor subsystem.

2. The data processing system as recited in claim 1 wherein the correspondence between a control signal and a digital signal processor subsystem is controllable.

3. The data processing system as recited in claim 2 wherein the channel block unit includes a plurality of match register/mask register pairs, each match register/mask register including signals indicative of a corresponding one of the control signals.

4. The data processing system as recited in claim 3 wherein the correspondence between a control signal and a digital signal processing unit is determined by the contents of the match register mask register pairs.

5. The data processing system as recited in claim 2 wherein the second peripheral direct memory access unit includes:
   a second switch responsive to a selected control signal; and a
   second buffer storage unit corresponding to each digital signal processor subsystem, the second buffer unit storing control signal groups related to the received packet.

6. The data processing system as recited in claim 2 wherein the storage unit is a first in-first out memory unit.

7. The method of transferring a signal packet from a high level data link controller to a first peripheral direct memory access unit in a data processing system having a plurality of digital signal processor subsystems, wherein each of the digital processor subsystems includes a first peripheral direct memory access unit, the method comprising:

processing the signal groups of the signal packet in the high level data link controller;

storing the processed data signal groups of the signal packet in a storage unit in the high level data link controller;

selecting one of a plurality of control signals from an address signal group of the signal packet, each control signal corresponding to a digital signal processor subsystem; and applying a selected control signal to a switch in a second the peripheral direct memory access unit, the switch coupling the storage unit to a one of a plurality of buffer storage units in the second peripheral direct memory access unit, the one buffer storage unit transferring data signal groups to a first peripheral direct memory access unit in the digital signal processor subsystem to which the selected control signal corresponds.

8. The method as recited in claim 7 wherein the control signal generated from the address signal group can correspond to a predetermined digital signal processor subsystem.

9. The method as recited in claim 8 further comprising comparing the address signal group of the signal packet with the contents of a match register/mask register pair, the contents of the match register/mask register pairs determining the selected control signal.

10. The method as recited in claim 9 further comprising applying the selected control signal to a second switch in the second peripheral direct memory access unit, the second switch coupling the storage unit to a one of a second group of buffer storage units, the second buffer storage units storing control signal groups related to the signal packet.

11. The method as recited in claim 10 wherein the storage unit is a first in-first out memory unit.

12. In a high level data link controller of a data processing system exchanging signal groups with a second peripheral direct memory access unit, the second peripheral direct memory access unit exchanging signal groups with a first peripheral direct memory access unit in each of a plurality of digital signal processor subsystems, a channel block unit for selecting a control signal in response to application of an address signal group, the channel block unit comprising:

a plurality of match register/mask register pairs, each match register/mask register pairs storing address signal groups identifying address space of a one of the plurality of digital signal processor subsystems;

an address register storing the address signal group of a received signal packet;

a first logic AND gate having signals from the address register and the match register of an enabled match register/mask register pair applied to input terminals thereof;

a second logic AND gate having signals from a mask register of an enabled match register/mask register pair applied to input terminals thereof;

a compare unit having the output signals of the first and the second logic AND gates applied thereto, the compare unit providing a compare signal when the output signals from the first and second logic AND gates are the same; and a coincidence circuit for determining which enabled match register/mask register pair results in a compare signal, the coincidence circuit activating one of a plurality of INTERRUPT signals corresponding to the enabled match register/mask register pair resulting in the compare signal, the INTERUPT signal specifying a buffer memory unit in the second peripheral direct memory access unit coupled to the digital signal processor subsystem to which a data signal group is addressed.

13. The channel block unit as recited in claim 12 further comprising a strobe unit, the strobe unit applying signals sequentially activating the match register/mask register, the strobe signals being applied to the coincidence circuit to identify the currently enabled match register/mask register pair.

14. The channel block unit as recited in claim 13 wherein the contents of the match register/mask register pair can changed, the contents of a match register/mask register pair determining to which digital signal processor subsystem the signal groups from the received signal packet will be forwarded.

* * * * *